United States Patent
Yoshino

(10) Patent No.: US 9,584,319 B2
(45) Date of Patent: Feb. 28, 2017

(54) OPTICAL RECEIVING DEVICE IN OPTICAL COMMUNICATION SYSTEM, CONTROL METHOD AND DEVICE OF PHOTON DETECTOR, AND DARK COUNT EVALUATION METHOD OF PHOTON DETECTOR

(71) Applicant: NEC Corporation, Minato-ku, Tokyo (JP)

(72) Inventor: Ken-ichiro Yoshino, Tokyo (JP)

(73) Assignee: NEC CORPORATION, Tokyo (JP)

(*) Notice: Subject to any disclaimer, the term of this patent is extended or adjusted under 35 U.S.C. 154(b) by 118 days.

(21) Appl. No.: 14/439,043

(22) PCT Filed: Oct. 29, 2013

(86) PCT No.: PCT/JP2013/006397
§ 371 (c)(1),
(2) Date: Apr. 28, 2015

(87) PCT Pub. No.: WO2014/068959
PCT Pub. Date: May 8, 2014

(65) Prior Publication Data
US 2015/0304106 A1  Oct. 22, 2015

(30) Foreign Application Priority Data
Nov. 1, 2012 (JP) ................ 2012-241488

(51) Int. Cl.
*H04B 10/70* (2013.01)
*H04L 9/08* (2006.01)

(52) U.S. Cl.
CPC .......... *H04L 9/0852* (2013.01); *H04B 10/70* (2013.01)

(58) Field of Classification Search
CPC ....... H04B 10/70; H04B 10/25; H04L 9/0852; H04L 7/0008; G01J 2001/442; G01J 2001/4466; G01J 11/00
USPC .......... 250/214 R, 214.1; 398/130, 202–213, 398/147, 25; 455/410, 411, 515; 380/252–260, 28, 44
See application file for complete search history.

(56) References Cited

U.S. PATENT DOCUMENTS 7,580,524 B2 * 8/2009 Gisin ................ H04L 9/0852
380/256

FOREIGN PATENT DOCUMENTS

JP   2009-509366 A   3/2009
JP   2009-509367 A   3/2009

OTHER PUBLICATIONS

International Search Report for PCT Application No. PCT/JP2013/006397, mailed Jan. 7, 2014.
(Continued)

*Primary Examiner* — Que T Le

(57) ABSTRACT

[Problem] It is to provide an optical receiving device, a control method and device of a photon detector, and a dark count evaluation method of the photon detector that make it possible to perform a dark count evaluation with the photon detector performing a receiving operation. [Solution] It is to include a Z pulse information detection unit 205 and a control unit 204 selectively extracting outputs of photon detectors PD1 and PD2 to a transmission light pulse with light intensity substantially equal to zero included in a transmission light pulse train and a dark count evaluation unit 206 evaluating dark counts of the photon detectors based on photon detection counts indicated by the extracted outputs.

14 Claims, 4 Drawing Sheets

(56) References Cited

OTHER PUBLICATIONS

English Translation of written opinion for PCT Application No. PCT/JP2013/006397.
Bennett et al, "Quantum Cryptography: Public Key Distribution and Coin Tossing", IEEE Int. Conf. on Computers, Systems, and Signal Processing, Dec. 10-12, 1984, p. 175, Bangalore, India.
M. Hayashi, "Upper bounds of eavesdropper's performances in finite-length code with the decoy method" Physical Review A, vol. 76, 012329 (2007).
M. Sasaki et al., "Field test of quantum key distribution in the Tokyo QKD Network" May 23, 2011/vol. 19,11/Optics Express, 10387.

\* cited by examiner

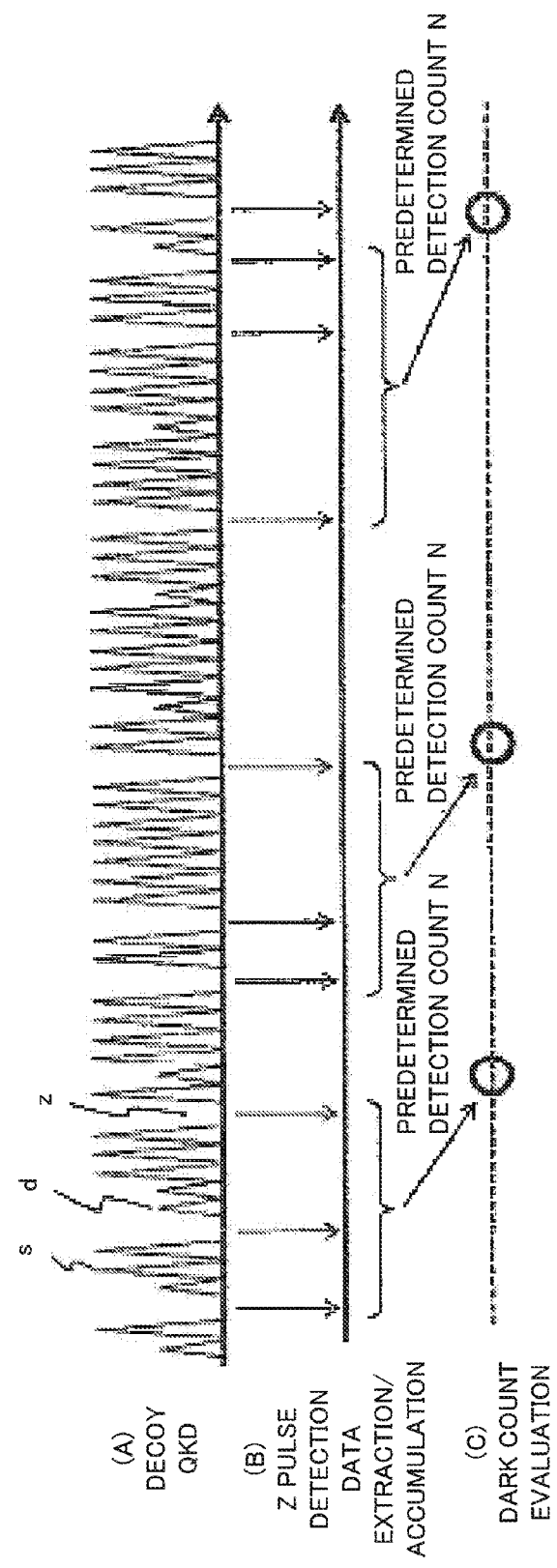

US 9,584,319 B2

OPTICAL RECEIVING DEVICE IN OPTICAL COMMUNICATION SYSTEM, CONTROL METHOD AND DEVICE OF PHOTON DETECTOR, AND DARK COUNT EVALUATION METHOD OF PHOTON DETECTOR

This application is a National Stage Entry of PCT/JP2013/006397 filed on Oct. 29, 2013, which claims priority from Japanese Patent Application 2012-241488 filed on Nov. 1, 2012, the contents of all of which are incorporated herein by reference, in their entirety.

TECHNICAL FIELD

The present invention relates to optical receiving devices in optical communication systems using photons as a communication medium, in particular, to a dark count evaluation method of a photon detector and a control method and device for a photon detector based on a dark count probability.

BACKGROUND ART

Recently, quantum key distribution (QKD) as a method to realize a cryptographic communication having information-theoretical security against eavesdropping has been actively studied (NPL 1) and its development for practical use has been underway. Especially, for safety improvement, the "decoy method" of detecting eavesdropping attacks by changing from time to time the intensity of faint light pulses used for QKD is employed in most QKD systems for practical use (refer to NPL 2).

Since a "single photon" including only one photon in one pulse (or a "pseudo single photon" obtained by extremely attenuating normal laser light) is used as a communication medium in QKD, a photon detector capable of detecting a single photon is used instead of a light detector as used in a conventional optical communication. An avalanche photodiode (APD) to which a bias exceeding a breakdown voltage is applied or a superconducting element cooled to a few degrees K are generally used as the photon detector.

A variety of methods for QKD have been proposed, and a method of using two or four photon detectors is a common practice (for example, refer to NPL 3). Although it is desirable that characteristics of all photon detectors are as uniform as possible in order to ensure the security of cryptographic keys generated by QKD if a plurality of photon detectors are used, the characteristics of APD elements and superconducting elements generally have large variations and also vary due to fluctuations of environmental temperatures and the deterioration of the elements. Therefore, it is necessary to check the characteristics regularly in operating QKD for a long time and to equalize the characteristics by individually adjusting external parameters such as a bias voltage.

There are quantum efficiency and dark count probability as principal parameters indicating characteristics of photon detectors. The quantum efficiency is a probability of outputting a detection signal correctly when a photon detector receives pulses including a single photon (a detection probability of a photon). The dark count probability is a probability of outputting a detection signal even though there are no photons, and it represents a magnitude of noise. Typically, the quantum efficiency is about 10% and the dark count probability is at the same level as $10^{-5}$.

CITATION LIST

Non Patent Literature

[NPL 1]
Bennett, Brassard, IEEE Int. Conf. on Computers, Systems, and Signal Processing, Bangalore, India, p. 175, 1984
[NPL 2]
M. Hayashi, "Upper bounds of eavesdropper's performances in finite-length code with the decoy method" Physical Review A, Vol. 76, 012329 (2007)
[NPL 3]
M. Sasaki et al., "Field test of quantum key distribution in the Tokyo QKD Network" Opt. Express 19, 10387 (2011)

SUMMARY OF INVENTION

Technical Problem

Although the evaluation of the quantum efficiency is relatively easy since it is only necessary to compare detection counts in each photon detector, there is a difficulty that the dark count has to be counted by blocking incident lights and it is impossible to perform a predetermined receiving operation in the meantime.

As an example of a case that a QKD system has been operated for a long time, as illustrated in FIG. 1, preparing a receiving operation mode 1 to perform a cryptographic key generation as usual and an adjustment mode 2 to evaluate and adjust a dark count probability by temporarily blocking an incident light into a photon detector, a dark count evaluation 3 of the photon detector is performed by switching them regularly. Since about 5% of a total operating time is allocated to the adjustment mode in many cases, a key generation speed of QKD is decreased due to the suspension of the receiving operation during the time.

The object of the present invention is to provide an optical receiving device, a control method and device of a photon detector, and a dark count evaluation method of the photon detector that make it possible to perform a dark count evaluation with the photon detector performing a receiving operation.

Solution to Problem

An optical receiving device according to an exemplary aspect of the present invention includes a photon detector; an extraction means for selectively extracting an output of the photon detector to a transmission light pulse with light intensity substantially equal to zero included in a transmission light pulse train; and a dark count evaluation means for evaluating a dark count of the photon detector based on a photon detection count indicated by the extracted output.

A control method of a photon detector according to an exemplary aspect of the present invention includes selectively extracting an output of the photon detector to a transmission light pulse with light intensity substantially equal to zero included in a transmission light pulse train; and controlling a characteristic parameter of the photon detector based on a photon detection count indicated by the extracted output.

A control device for a photon detector according to an exemplary aspect of the present invention includes an extraction means for selectively extracting an output of the photon detector to a transmission light pulse with light intensity substantially equal to zero included in a transmission light pulse train; and a control means for controlling a characteristic parameter of the photon detector based on a photon detection count indicated by the extracted output.

A dark count evaluation method of a photon detector according to an exemplary aspect of the present invention includes selectively extracting an output of the photon detector to a transmission light pulse with light intensity substantially equal to zero included in a transmission light pulse train; and evaluating a dark count of the photon detector based on a photon detection count indicated by the extracted output.

Advantageous Effects of Invention

According to the present invention, it becomes possible to perform a dark count evaluation with a photon detector performing a receiving operation by evaluating a dark count utilizing a transmission light pulse whose light intensity is substantially equal to zero included in a transmission light pulse train.

BRIEF DESCRIPTION OF DRAWINGS

FIG. 4 is a time chart illustrating a dark count evaluation method of an optical communication system in accordance with the present exemplary embodiment.

DESCRIPTION OF EMBODIMENTS

Figure 1:
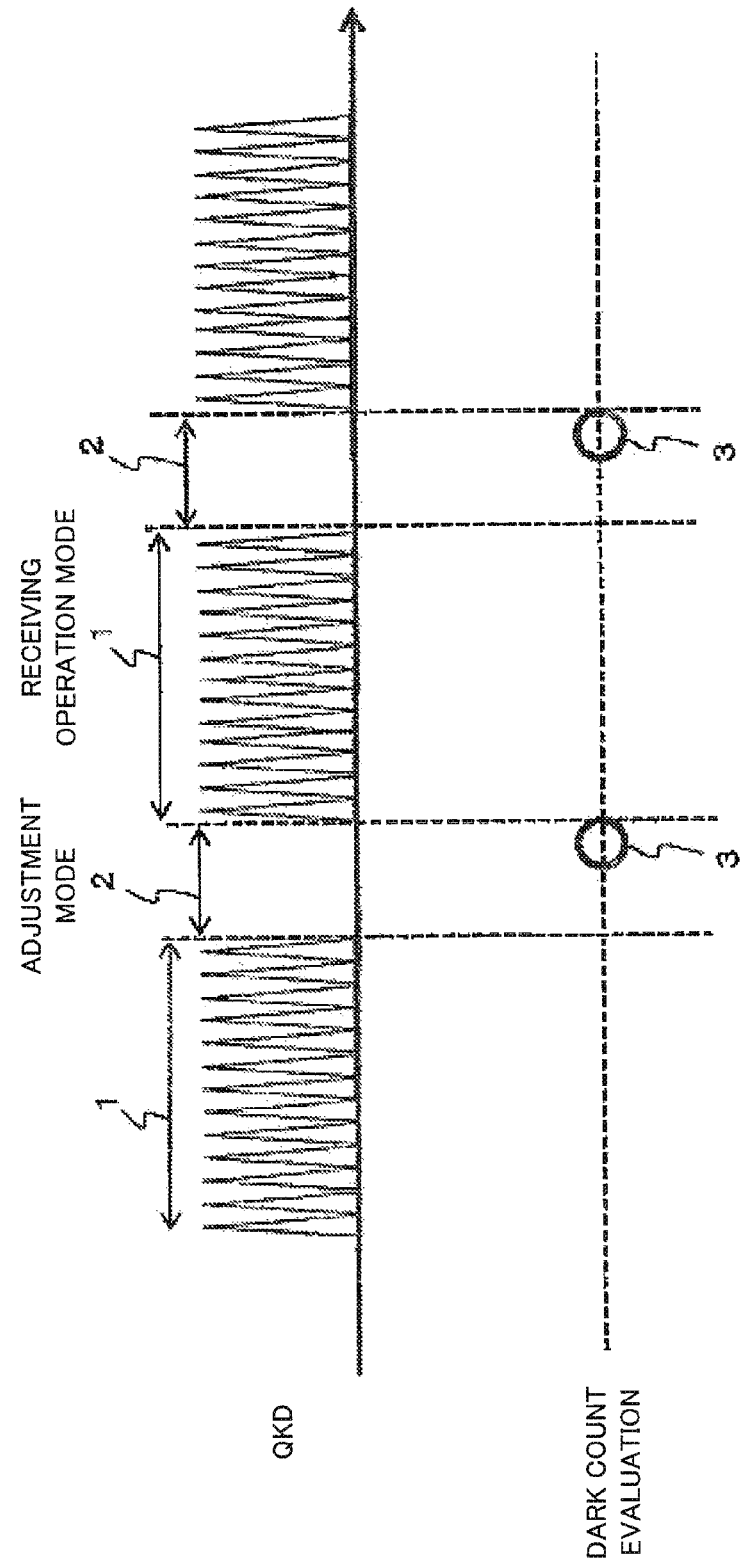
FIG. 1 is a time chart illustrating a dark count evaluation method with an adjustment mode being set.
Figure 2:
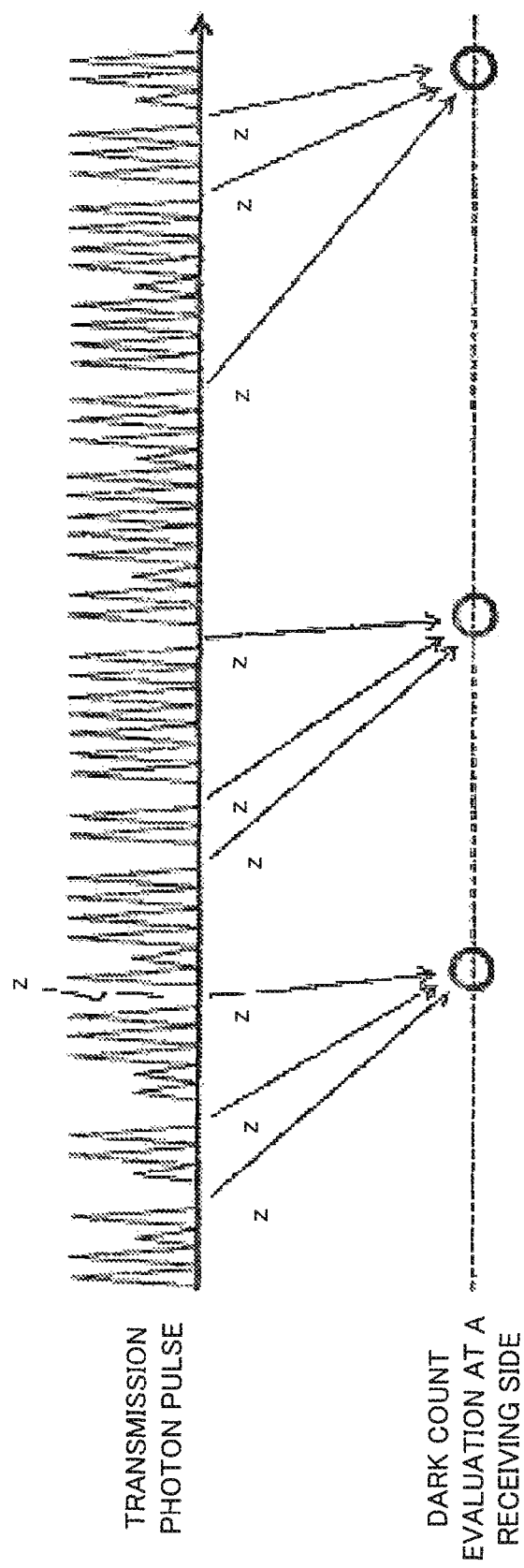
FIG. 2 is a time chart illustrating an overview of the present invention.

As illustrated in FIG. 2, according to the exemplary embodiment of the present invention, a dark count evaluation is performed by utilizing detection data in a timing (hereinafter, referred to as a Z pulse for convenience) when the light intensity is substantially equal to zero (an average photon count is equal to zero) included in a transmission light pulse train among detection data obtained by detecting the transmission light pulse train using a photon detector. In particular, a rate of a photon detection count by means of the photon detector to the number of transmitted Z pulses is evaluated as a dark count probability. Therefore, it is possible to perform a dark count evaluation keeping the photon detector in an operation mode and it is not necessary to interrupt a system operation for adjustment. The dark count evaluation method in accordance with an exemplary embodiment of the present invention will be described in detail below using a QKD system employing a decoy method including Z pulses as an example.

1. System Configuration

Figure 3:
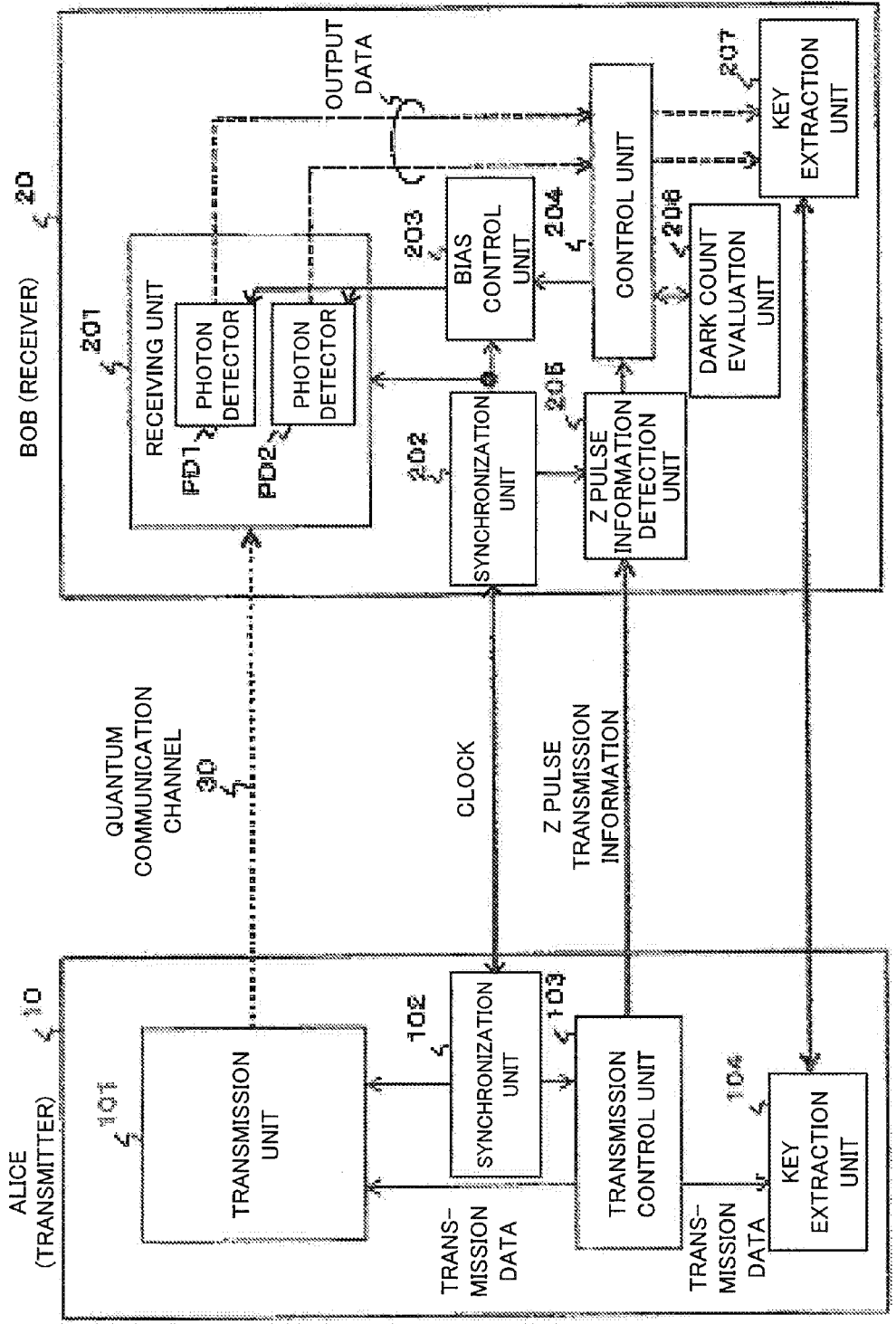
FIG. 3 is a block diagram illustrating configurations of a transmitter and a receiver of an optical communication system in accordance with an exemplary embodiment of the present invention.

As illustrated in FIG. 3, in an optical communication system in accordance with an exemplary embodiment of the present invention, a transmitter 10 at a side where a cryptographic key is transmitted (Alice) is connected to a receiver 20 at a side where the cryptographic key is received (Bob) by an optical fiber. It is assumed that the transmitter 10 and the receiver 20 communicate with each other by a quantum communication channel 30 mentioned below and conventional communication channels 31 to 33.

The transmitter 10 includes a transmission unit 101 performing quantum communication, a synchronization unit 102 performing clock synchronization with a receiving side, a transmission control unit 103 controlling decoy transmission and sending Z pulse transmission information to the receiving side, and a key extraction unit 104 generating a cryptographic key by sending a part of data between each other intercommunicating with the receiver 20. Although the transmission unit 101 includes a laser light source generating light pulses, a phase modulator, and the like, they are not directly related to the operation in accordance with the present invention and therefore the description of them is omitted.

The receiver 20 includes a receiving unit 201 including a plurality of photon detectors (PD1 and PD2 here), a synchronization unit 202 performing clock synchronization with the transmitting side, a bias control unit 203 controlling each of bias voltages of the photon detectors PD1 and PD2, a control unit 204 controlling a dark count evaluation, a key extraction, and the like mentioned below, a Z pulse information detection unit 205 detecting Z pulse information from Z pulse transmission information received from the transmitter 10, a dark count evaluation unit 206 evaluating a dark count probability of the photon detectors based on the Z pulse information and output data of the photon detectors PD1 and PD2, and a key extraction unit 207 generating a cryptographic key by sending a part of data between each other intercommunicating with the transmitter 10. Although the receiving unit 201 includes a phase modulator, an interferometer with two inputs and two outputs (a Mach-Zehnder interferometer, for example), and the like, they are not directly related to the operation in accordance with the present invention and therefore the description of them is omitted.

It is also possible to realize functions equivalent to the control unit 204, the Z pulse information detection unit 205, and the dark count evaluation unit 206 by means of a computer executing a program stored in a memory which is not illustrated.

2. System Operation

The transmission unit 101 in the transmitter 10 transmits intensity-modulated photon pulses based on the decoy method according to transmission data from the transmission control unit 103 to the receiver 20 through the quantum communication channel 30. In parallel with this, the transmission control unit 103 sends to the receiver 20 transmission information of the Z pulse with light intensity equal to zero in transmitted photon pulses. The quantum communication channel 30 is a communication channel with a predetermined wavelength transmitting photon pulses composed of a single photon or a pseudo single photon. A conventional communication channel with normal intensity light pulse is used for a clock signal and Z pulse transmission information. The quantum communication channel 30 and the conventional communication channel can be wavelength-multiplexed in one optical fiber. It is only necessary for a channel between the key extraction unit 104 and the key extraction unit 207 to be a duplex conventional communication channel, and the Internet connection or the like is a typical example.

The photon detectors PD1 and PD2 in the receiving unit 201 detect photon pulses having arrived through the quantum communication channel 30 and output the detected data to the key extraction unit 207 according to the control of the control unit 204. The bias control unit 203 applies bias voltages to the photon detectors PD1 and PD2 synchronizing with timing when a photon pulse arrives and drives the photon detectors PD1 and PD2 respectively. Therefore, the data output from the photon detectors PD1 and PD2 indicate the presence or absence of a photon pulse having arrived through the quantum communication channel 30 and also indicate the presence or absence of a dark output at timing when the light intensity of a Z pulse is equal to zero. The Z pulse information detection unit 205 detects Z pulse transmission information received from the transmitter 10 through the conventional communication channel and outputs it to the control unit 204.

The control unit 204 extracts output data for the Z pulse from the output data of the photon detectors PD1 and PD2 according to the Z pulse transmission information and outputs them to the dark count evaluation unit 206. The dark count evaluation unit 206 calculates a probability of the dark output of each photon detector based on the Z pulse transmission information and the output data for the Z pulse. Since the intensity of the Z pulse is equal to zero, a detection probability in receiving the Z pulse corresponds to a dark count probability of the photon detector. The bias control unit 203 determines a bias voltage applied to each photon detector based on the dark count probability and adjusts the characteristics of the photon detectors PD1 and PD2.

3. Dark Count Evaluation

As illustrated in FIG. 4 (A), three kinds of light intensity are generally used in the decoy method, and the average number of photons included in a single pulse is represented by s, d, and z, respectively. The light pulse with the average photon number s is used as signal light and the information obtained by it is used for generating a quantum cryptographic key. In a typical QKD system with a transmission distance of the order of 50 km, s is approximately equal to 0.5. The light pulses with the average photon numbers d and z are used as decoy pulses for detecting eavesdropping and d is approximately equal to 0.2 and z is equal to zero, typically. Hereinafter, the light pulses with the average photon numbers s, d, and z are represented by S, D, and Z pulses, respectively. In the QKD system using the decoy method, the eavesdropping is detected by using most of the transmission pulses as the S pulse and randomly mixing the D pulse and Z pulse into a part of them. Typically in transmission pulses, the S pulses are present at about 90%, the D pulses are present at about 6%, and the Z pulses are present at about 4% (refer to NPL 3). Each of the S, D, and Z pulses is randomly transmitted, and the receiver 20 is notified after detection which pulse has been one of the S, D, or Z pulse.

As illustrated in FIGS. 4, (B) and (C), the QKD system in accordance with the present exemplary embodiment can operate in the key generation mode all the time by performing the dark count evaluation of the photon detector using a plurality of Z pulses. The operation of the dark count evaluation in accordance with the present exemplary embodiment will be described below.

If the Z pulse information detection unit 205 detects Z pulse transmission information, the control unit 204 selectively extracts detection data of the Z pulse (dark outputs) from the output data of the photon detectors PD1 and PD2 and stores them in the dark count evaluation unit 206 sequentially. As illustrated in FIGS. 4, (B) and (C), if Z pulse detection data have been accumulated until a statistically-significant number N (detection count of about 10 k), the dark count evaluation unit 206 evaluates as a dark count probability a rate of the count N with the dark outputs appearing among the number of transmitted Z pulses obtained from the Z pulse transmission information. That is to say, the dark count probability is calculated by the following formula:

The dark count probability=(the detection count $N$ of $Z$ pulses)/(the number of transmitted $Z$ pulses).

Based on the dark count probability, the bias control unit 203 is able to determine bias voltages applied to the photon detectors PD1 and PD2 and adjust the dark count probabilities in parallel. Thus, it becomes possible to equalize dark count probabilities of a plurality of photon detectors and to improve the security of cryptographic keys. In the present exemplary embodiment, it becomes possible to avoid a decrease in a key generation speed and eavesdropping attacks because it is not necessary to provide the QKD system with an adjustment mode of the photon detector.

4. Other Exemplary Embodiments

In the above-mentioned exemplary embodiment, the example is described in which two photon detectors PD1 and PD2 are included in the receiving unit 201, but the present invention is not limited to this and is applicable to a receiving unit including any number of photon detectors. For example, the present invention is similarly applicable to a receiving unit which includes four photon detectors and an asymmetrical Mach-Zehnder interferometer with two inputs and four outputs as illustrated in NPL 3.

Although the QKD system using the decoy method is described in the above-mentioned exemplary embodiment, the present invention is not limited to the decoy method but is applicable to all methods including transmission of light pulses with the intensity equal to zero.

Because it is possible to evaluate and adjust the dark count probability of the photon detector without using the adjustment mode according to the present invention, it becomes possible to avoid a decrease in a key generation speed due to introducing the adjustment mode and eavesdropping attacks.

5. Supplementary Notes

The whole or part of the exemplary embodiments disclosed above can be described as, but not limited to, the following supplementary notes.

(Supplementary Note 1)

An optical receiving device, comprising:

a photon detector;

an extraction means for selectively extracting an output of the photon detector to a transmission light pulse with light intensity substantially equal to zero included in a transmission light pulse train; and a dark count evaluation means for evaluating a dark count of the photon detector based on a photon detection count indicated by the extracted output.

(Supplementary Note 2)

The optical receiving device according to Supplementary note 1, wherein the extraction means receives, from a transmission side of the transmission light pulse, distribution arrangement information in the transmission light pulse train of the transmission light pulse with light intensity equal to zero.

(Supplementary Note 3)

The optical receiving device according to Supplementary note 1 or 2, wherein the transmission light pulse train comprises a plurality of light intensity levels including a light intensity level equal to zero.

(Supplementary Note 4)

The optical receiving device according to any one of Supplementary notes 1, 2, and 3, further comprising a control means for controlling a characteristic of the photon detector based on the evaluated dark count.

(Supplementary Note 5)

The optical receiving device according to Supplementary note 4, wherein the control means adjusts a characteristic parameter of each photon detector so as to equalize dark count probabilities of a plurality of photon detectors.

(Supplementary Note 6)

A control method of a photon detector, comprising:

selectively extracting an output of the photon detector to a transmission light pulse with light intensity substantially equal to zero included in a transmission light pulse train; and controlling a characteristic parameter of the photon detector based on a photon detection count indicated by the extracted output.

(Supplementary Note 7)

A control device of a photon detector, comprising:

an extraction means for selectively extracting an output of the photon detector to a transmission light pulse with light intensity substantially equal to zero included in a transmission light pulse train; and a control means for controlling a characteristic parameter of the photon detector based on a photon detection count indicated by the extracted output.

(Supplementary Note 8)

A dark count evaluation method of a photon detector, comprising:

selectively extracting an output of the photon detector to a transmission light pulse with light intensity substantially equal to zero included in a transmission light pulse train; and evaluating a dark count of the photon detector based on a photon detection count indicated by the extracted output.

(Supplementary Note 9)

An optical communication system, comprising:

an optical transmitter transmitting a transmission light pulse;

an optical receiver receiving the transmission light pulse;

the optical transmitter comprising a transmission means for transmitting a transmission light pulse train including a transmission light pulse with light intensity substantially equal to zero;

the receiver comprising a photon detection means for detecting the transmission light pulse;

an extraction means for selectively extracting an output of the photon detection means to a transmission light pulse with light intensity substantially equal to zero included in the transmission light pulse train; and a dark count evaluation means for evaluating a dark count of the photon detection means based on a photon detection count indicated by the extracted output.

(Supplementary Note 10)

A program making a computer perform a function for selectively extracting an output of the photon detector to a transmission light pulse with light intensity substantially equal to zero included in a transmission light pulse train; and a function for controlling a characteristic parameter of the photon detector based on a photon detection count indicated by the extracted output.

(Supplementary Note 11)

The control device of the photon detector according to the Supplementary note 9 or 10, wherein the control means adjusts a characteristic parameter of each photon detector so as to unify dark count probabilities of a plurality of photon detectors.

(Supplementary Note 12)

A dark count evaluation method of a photon detector in an optical communication system, the method including:

an output of the photon detector to a transmission light pulse with zero light intensity included in a transmission light pulse train is selectively extracted and a dark count of the photon detector is evaluated based on a photon detection count indicated by the extracted output.

(Supplementary Note 13)

The dark count evaluation method of the photon detector according to the Supplementary note 12, wherein the transmission light pulses with zero light intensity are dispersedly arranged in advance in the transmission light pulse train at a transmission side.

(Supplementary Note 14)

An optical communication system, including an optical transmitter for transmitting a transmission light pulse and an optical receiver for receiving the transmission light pulse, the optical transmitter including a transmission means for transmitting a transmission light pulse train including a transmission light pulse with substantially-zero light intensity and the receiver including:

a photon detection means for detecting the transmission light pulse;

an extraction means for selectively extracting an output of the photon detection means to a transmission light pulse with substantially-zero light intensity included in the transmission light pulse train; and a dark count evaluation means for evaluating a dark count of the photon detection means based on a photon detection count indicated by the extracted output.

(Supplementary Note 15)

The optical communication system according to the Supplementary note 14, wherein the extraction means receives distribution arrangement information in the transmission light pulse train of the transmission light pulse with zero light intensity from the receiver.

(Supplementary Note 16)

The optical communication system according to the Supplementary note 14 or 15, wherein the transmission light pulse train comprises a plurality of light intensity levels including zero light intensity.

(Supplementary Note 17)

The optical communication system according to any one of the Supplementary notes 14, 15, and 16, the receiver further comprising a control means for controlling a characteristic of the photon detection means based on the evaluated dark count.

(Supplementary Note 18)

The optical communication system according to the Supplementary note 17, wherein the photon detection means comprises a plurality of photon detectors and a characteristic parameter of each photon detector is adjusted such that the control means unifies dark count probabilities of the plurality of photon detectors.

(Supplementary Note 19)

The optical communication system according to any one of the Supplementary notes 14, 15, 16, 17, and 18, wherein the transmission light pulse is a photon pulse consisting of a single photon or a pseudo single photon.

(Supplementary Note 20)

A program causing a computer to function to control a photon detector in an optical receiver, the computer implementing:

a function for selectively extracting an output of the photon detector to a transmission light pulse with substantially-zero light intensity included in a transmission light pulse train; and a function for controlling a characteristic parameter of the photon detector based on a photon detection count indicated by the extracted output.

INDUSTRIAL APPLICABILITY

The present invention is applicable to a general optical receiving device including a photon detector and, for example, to the characteristic adjustment of a photon detector in a quantum key distribution system.

REFERENCE SIGNS LIST

10 Transmitter
20 Receiver
30 Quantum communication channel
101 Transmission unit
102 Synchronization unit
103 Transmission control unit
104 Key extraction unit
201 Receiving unit
202 Synchronization unit
203 Bias control unit
204 Control unit
205 Z pulse information detection unit
206 Dark count evaluation unit
207 Key extraction unit
PD1, PD2 Photon detector

What is claimed is:

1. An optical receiving device, comprising:
a photon detector;
an extraction unit selectively extracting an output of the photon detector to a transmission light pulse with light intensity substantially equal to zero included in a transmission light pulse train; and
a dark count evaluation unit evaluating a dark count of the photon detector based on a photon detection count indicated by the extracted output.

2. The optical receiving device according to claim 1, wherein the extraction unit receives, from a transmission side of the transmission light pulse, distribution arrangement information in the transmission light pulse train of the transmission light pulse with light intensity equal to zero.

3. The optical receiving device according to claim 1, wherein the transmission light pulse train comprises a plurality of light intensity levels including a light intensity level equal to zero.

4. The optical receiving device according to claim 1, further comprising
a control unit controlling a characteristic of the photon detector based on the evaluated dark count.

5. The optical receiving device according to claim 4, wherein the control unit adjusts a characteristic parameter of each photon detector so as to equalize dark count probabilities of a plurality of photon detectors.

6. A control method of a photon detector, comprising:
selectively extracting an output of the photon detector to a transmission light pulse with light intensity substantially equal to zero included in a transmission light pulse train; and
controlling a characteristic parameter of the photon detector based on a photon detection count indicated by the extracted output.

7. A control device of a photon detector, comprising:
an extraction unit selectively extracting an output of the photon detector to a transmission light pulse with light intensity substantially equal to zero included in a transmission light pulse train; and
a control unit controlling a characteristic parameter of the photon detector based on a photon detection count indicated by the extracted output.

8. The optical receiving device according to claim 2, wherein the transmission light pulse train comprises a plurality of light intensity levels including a light intensity level equal to zero.

9. The optical receiving device according to claim 2, further comprising
a control unit controlling a characteristic of the photon detector based on the evaluated dark count.

10. The optical receiving device according to claim 3, further comprising
a control unit controlling a characteristic of the photon detector based on the evaluated dark count.

11. The optical receiving device according to claim 8, further comprising
a control unit controlling a characteristic of the photon detector based on the evaluated dark count.

12. The optical receiving device according to claim 9, wherein the control unit adjusts a characteristic parameter of each photon detector so as to equalize dark count probabilities of a plurality of photon detectors.

13. The optical receiving device according to claim 10, wherein the control unit adjusts a characteristic parameter of each photon detector so as to equalize dark count probabilities of a plurality of photon detectors.

14. The optical receiving device according to claim 11, wherein the control unit adjusts a characteristic parameter of each photon detector so as to equalize dark count probabilities of a plurality of photon detectors.

* * * * *